June 19, 1934.  O. BALLERT  1,963,286
HYDRAULIC TILTING DEVICE, ESPECIALLY FOR
TILTING THE BODIES OF MOTOR VEHICLES
Filed April 21, 1932  3 Sheets-Sheet 3

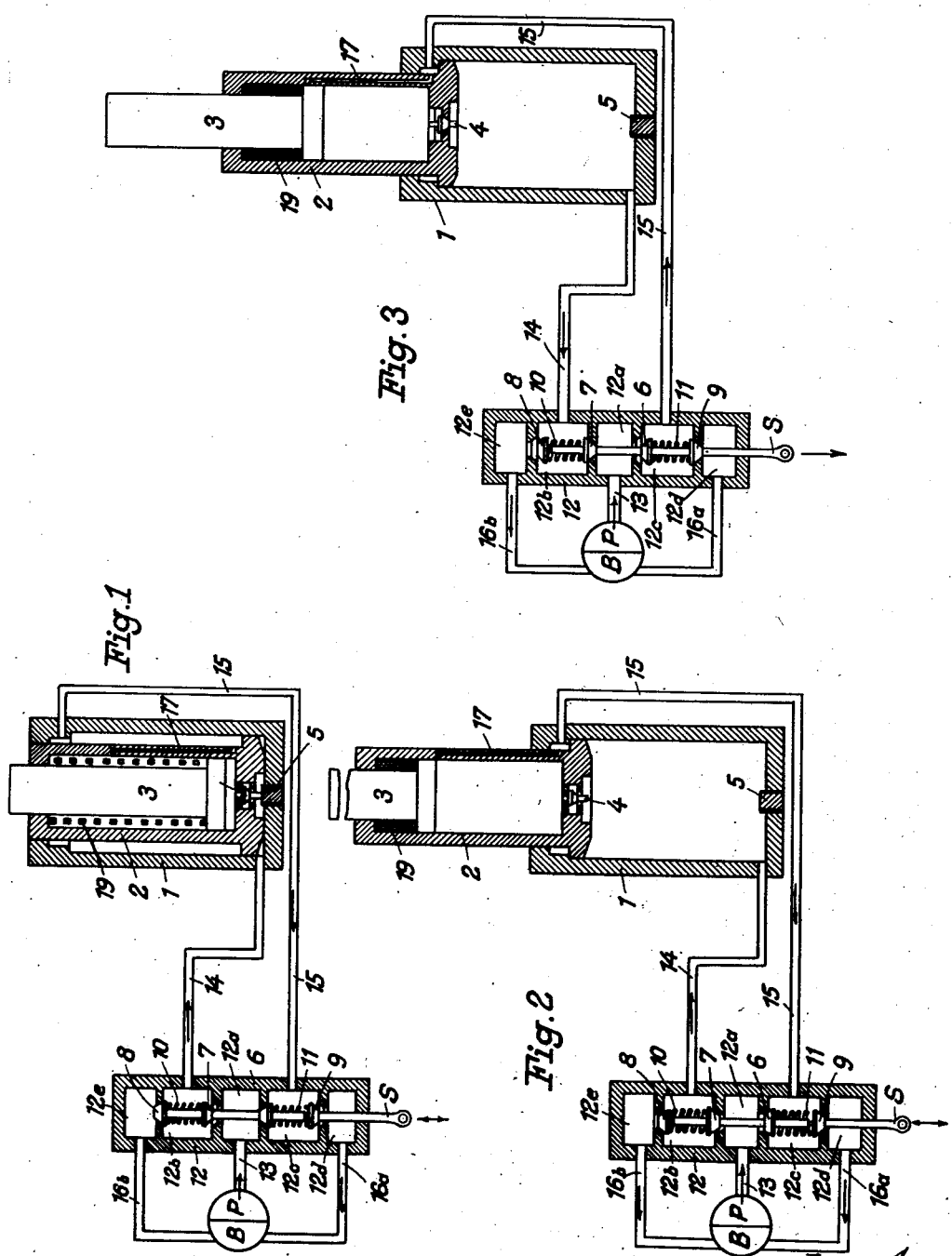

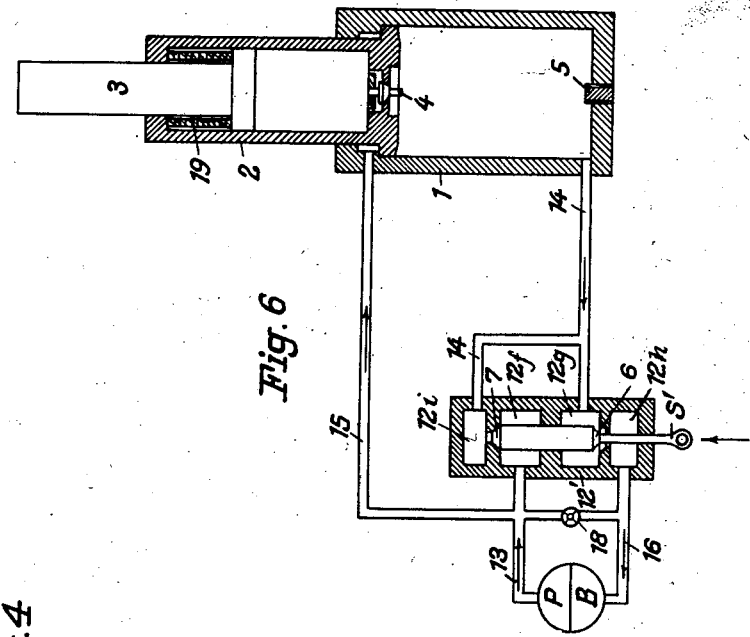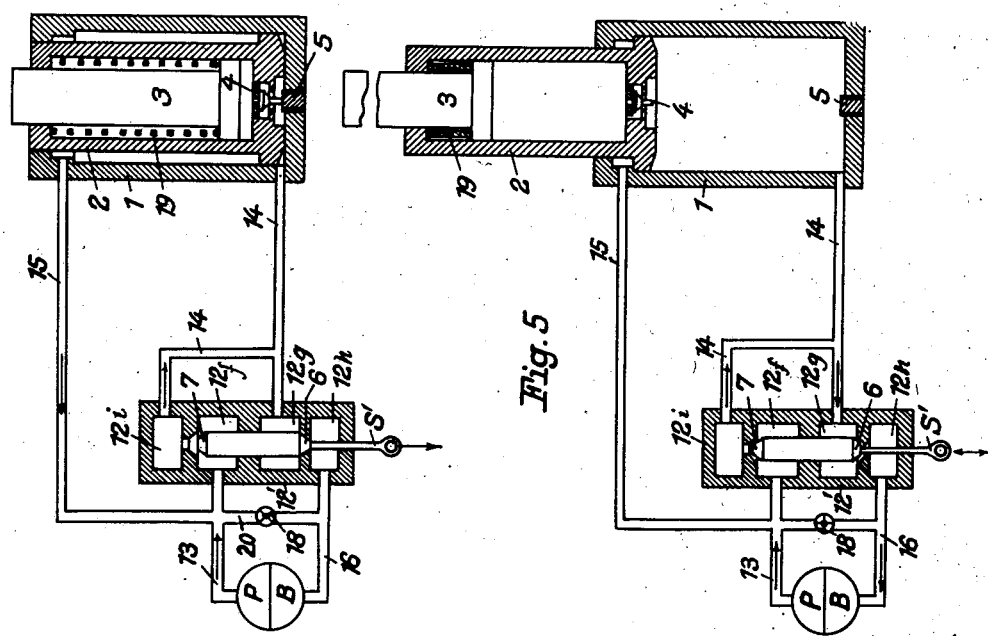

INVENTOR
OTTO BALLERT
BY
John P. Barbo
ATTORNEY

Patented June 19, 1934

1,963,286

UNITED STATES PATENT OFFICE 1,963,286

HYDRAULIC TILTING DEVICE, ESPECIALLY FOR TILTING THE BODIES OF MOTOR VEHICLES

Otto Ballert, Berlin, Germany

Application April 21, 1932, Serial No. 606,657
In Germany November 1, 1927

5 Claims. (Cl. 138—9)

My invention relates to a hydraulic tilting device especially to motor vehicles in which between the cylinder of the lifting device and the upper part of the telescopic piston an annular chamber is provided intermittently or continuously connected with the pressure pipe.

There is already in use with tilting devices for truck bodies an arrangement for providing on both sides of the piston pressure surfaces of different size and to maintain these continuously in connection with the pressure pipe. Further there is in use a valve arrangement between the greater pressure chamber of the hydraulic piston and the suction chamber to control the direction of the stroke of the device by opening or closing the valve.

My invention consists in using for the controlling of the pressure fluid at least two valves moved simultaneously or a double-valve with two valve-seat surfaces. These valves are so controlled that either half the valves are completely closed whilst the others are opened or that all the valves are opened simultaneously. In this way it is possible to form an open circuit from the pressure pipe to the suction pipe, whereby even when the pump is working, the pressure in the cylinder chamber of the lifting device can be adjusted to and maintained at any height desired, thus insuring that the lifting device can be maintained in any desired position. If telescopically engaging pistons are employed then a special control valve for the pressure fluid is provided in the bottom of the largest piston. This control valve is formed as back pressure valve and is closed during the lowering of the piston by means of an adjustable stop arranged in the bottom of the largest cylinder. This serves to insure a proper return of the piston to its normal position.

In the drawings four embodiments of the invention are shown.

Figs. 1-3 show diagrammatically one embodiment of the invention with a four-seat control valve and transfer ports.

Figs. 4-6 show schematically an embodiment of the invention with a two-seat control valve and safety valve.

In these two embodiments the largest cylinder enclosing the telescopic pistons to be lifted and lowered is connected with the chassis. The largest telescopic piston is thus pushed upwards until it reaches the upper end of the cylinder; after the largest piston has completed its stroke the pressure is communicated to the other smaller pistons by means of a back pressure valve arranged in the bottom of the largest piston.

Figure 7:
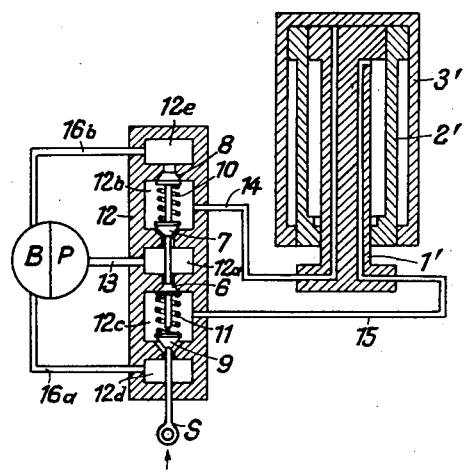
Figure 8:
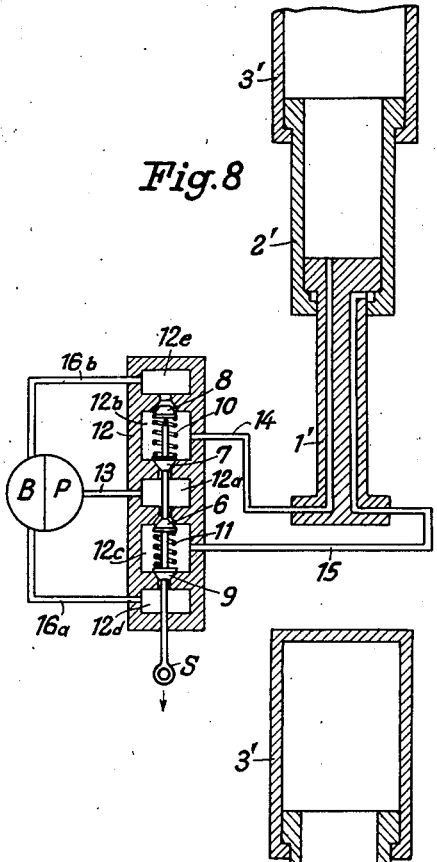
Figure 9:
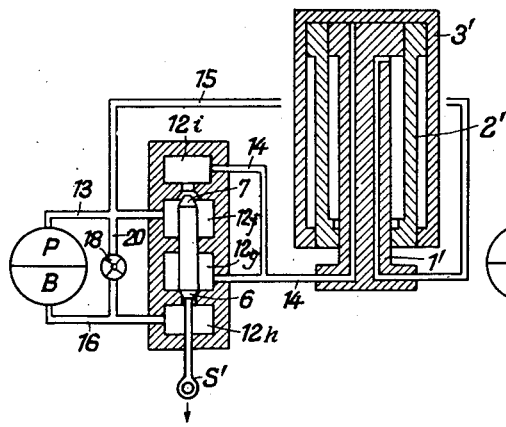
Figure 10:
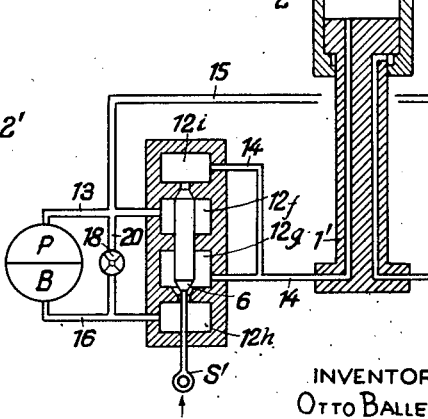

In the two embodiments of the invention shown in Figs. 7 and 8 and in Figs. 9 and 10 respectively the midmost and smallest piston is rigidly mounted, i. e. is connected with the chassis, while the larger cylindrical pistons surrounding it are arranged movably, i. e. can be raised and lowered.

Figs. 7 and 8 show schematically an embodiment with a four-seat control valve.

Figs. 9 and 10 show schematically an embodiment with a two-seat control valve.

In the drawings 1 designates the cylinder of the pressure piston of the lifting device which is here for the sake of simplicity shown with only two movable pistons, whereas in practice the latter may of course be of any number desired. 2 and 3 designate the pistons. 4 is a back pressure valve arranged in the bottom of the largest piston 2. 5 is an adjustable stop mounted in the cylinder 1, by means of which the valve 4 is opened during the descent of the piston 2 in a predetermined position. S designates a valve spindle actuated by a controlling lever not shown in the drawings, and bearing as in the first embodiment (Figs. 1-3) four valve cones, two of which, viz. valve cones 6 and 7 are firmly connected with the valve spindle, while the other two, 8 and 9 can slide freely along the spindle and are under the action of pressure springs 10 and 11. The valve spindle and its appertaining parts lie in a control box 12 which is divided by partition walls into five chambers. These are: the midmost chamber 12a into which the pipe 13 conducting the pressure fluid from pressure pump P discharges. Adjoining this midmost pressure chamber 12a are chambers 12b and 12c, from which pipes 14 and 15 lead to the lifting device. On the other sides of pressure chambers 12b and 12c and in communication therewith, are provided at either end of the control box chambers 12d and 12e respectively from which pipes 16a and 16b respectively lead to the reservoir B containing the pressure fluid. 17 designates a transfer port arranged in the wall of piston 2 and leading from the interior chamber of piston 2 to the space between piston 2 and cylinder 1. When piston 3 reaches a certain extremity of its stroke, this transfer port is freed, so that the fluid from the pressure chamber under piston 3 can flow across into the space between piston 2 and cylinder 1. 19 designates a buffer spring arranged between piston 3 and piston 2 and serving to absorb shocks or blows in the event of an overtilting of the truck body, i. e. when the centre of gravity passes beyond the vertical plane of the oscillating axle of the truck body.

In the second embodiment (Figs. 4–6) the controlling cylinder 12' has only 4 chambers 12f, 12g, 12h and 12i respectively, and the valve spindle S' is provided with only two valves 6' and 7' rigidly connected with it. The pipe 13 leading from the pressure pump P into chamber 12f branches off beforehand in two directions. 15 designates the one branch, leading to the lifting device, and 20 designates the second branch. The latter constitutes the connection between return circuit pipe 16, leading from chamber 12h to the reservoir B. Pipe 20 is provided with a safety valve 18. From chamber 12g a pipe 14 leads to the lifting-device. This pipe 14 is also connected by a branch pipe with the chamber 12i.

The mode of working of the device as shown in Figs. 1–3 is briefly as follows:

The valve-spindle S and the thereto appertaining valves 6, 7, 8 and 9 are set from the control device at "lift" (Fig. 1). In this position valves 6 and 8 are closed, valves 7 and 9 opened. The pressure fluid entering the chamber 12a through pipe 13 flows through the opened valve 7 and the pipe 14 to the lifting device into the space under the piston 2 and raises this piston together with piston 3 upon which the load of the body rests. After piston 2 has finished its stroke, piston 3 is raised further, the pressure fluid passing into the space under piston 3 through the back pressure valve 4. At a certain position piston 3 frees the transfer port 17, so that the pressure fluid from the space under piston 3 can flow through transfer port 17 into the tube 15 and thence into chamber 12c and from the latter through chamber 12d and tube 16a into the receptacle B.

This constitutes the most extreme position, as shown in Fig. 2. It is also possible to fix the lifting-device at any lifting position desired, if the controlling-spindle and the control valves are placed in a position such as shown in Fig. 2. Then all four valve-cones 6, 7, 8, 9 are lifted from their seats, so that all five chambers 12a–12e are connected with one another and the fluid delivered by the pump returns through the throttled valve-sections, partly through chamber 12d and pipe 16a, partly through chamber 12e and pipe 16b, into receptacle B.

If the body is to be lowered the controlling device is put into the position shown in Fig. 3. In this case the valve-cones 7 and 9 rest firmly on their seats. The pressure fluid delivered by the pump passes now from chamber 12a into chamber 12c and thence through pipe 15 into the annular chamber between piston 2 and cylinder 1. The space under piston 2 is connected with receptacle B by pipe 14, chambers 12b and 12e and by pipe 16b. Piston 2 is thus drawn downward together with piston 3. During this process piston 3 is first coupled hydraulically with piston 2, as after the closing of the transfer port 17 the pressure fluid under piston 3 is unable to escape. Not until valve 4 at the sinking of piston 2 abuts onto stop 5 and is thus opened, can the fluid under piston 3 escape through valve 4 and piston 3 complete its downward stroke.

The mode of action of the device shown in Figs. 4–6 is as follows:

If the controlling device is set at "lift" the lower valve 6' is closed and the upper valve 7' is opened. The pressure fluid delivered by pump P passes out on the one hand from pipe 13 through pipe 15 into the annular chamber between the outer cylinder 1 and piston 2. On the other hand the pressure fluid passes also from pipe 13 through chambers 12f and 12i and tube 14 into the space between piston 2 and the lower end wall of cylinder 1. As this surface is essentially larger than the annular surface upon which the same pressure is exercised from above, piston 2 is raised, being subjected only to a pressure corresponding to the difference in the area of the surfaces. As soon as piston 2 has completed its stroke, the pressure fluid passes through valve 4 into the space under piston 3 and raises the latter against the pressure of spring 19.

Owing to the fact that in this form of embodiment the pressure is applied on piston 2 only in proportion to the difference between the lower piston surface and the upper piston ring surface, it is possible, by choosing pistons 2 and 3 to reduce the difference in pressure in the system when transferring the load from the large piston to the small piston while lifting the load,—and thus to render the strain on the pump during the lifting more uniform than has been the case with devices hitherto used.

On stopping, the valve spindle S is brought into an intermediary position, see Fig. 5, in which both valves 6' and 7' are opened. The pressure fluid from the pump then flows through the throttled valve-section 7', through pipe 14 into chamber 12g and thence through valve-section 6' and chamber 12h into pipe 16 and through the latter back to receptacle B.

In case valve spindle S' is not brought into the intermediary position as in Fig. 5, safety valve 18 opens as the pistons reach the full extremity of their stroke, and lets the pressure fluid flow back from the pump directly into the receptacle B, the pressure thus being prevented from exceeding a certain limit.

To lower, the valve spindle S' is brought by means of the controlling device into the position shown in Fig. 6, in which valve 7' is closed and valve 6' opened. The pressure fluid passes also in this case from pump P through tube 13 and pipe 15 into the annular chamber between cylinder 1 and piston 2. The fluid which is under piston 2 flows through pipe 14 and chambers 12g and 12h and pipe 16 back into receptacle B.

In the annular chamber between cylinder 1 and piston 2 the pressure exercised by the fluid tends to drive back the piston. Piston 3 is again coupled hydraulically with piston 2. Not until valve 4 abuts onto stop 5 is valve 4 opened, thus allowing the fluid under piston 3 to escape and piston 3 to complete its downward stroke.

In the two tilting devices described above the outermost cylinder including the telescopic pistons is connected with the chassis. Thereby the largest telescopic piston is first subjected to the pressure and is moved until it reaches its stop in the cylinder. When the largest piston has completed its stroke the pressure is communicated also to the further smaller pistons by means of a back pressure valve arranged in the bottom of the largest piston. In order to prevent a sudden overturning of the tilted truck body and dangerous shocks resulting therefrom at the moment when the centre of gravity of the body passes beyond the vertical plane of its oscillating axis, a buffer spring is arranged between the smallest telescopic piston and the next larger telescopic piston surrounding it serving to absorb the shock of the overturning body. Therefore a back pressure valve is absolutely necessary, since when the centre of gravity of the body on its return movement passes back again beyond the vertical plane of its oscillating axis it is necessary to avoid the smallest piston being driven with a certain shock into the next larger piston. This is ensured by means of the back pressure valve, the two upper pistons being held at the same time rigidly coupled by the pressure fluid. This rigid coupling is furthermore necessary to enable the tilting device to be fixed at any desired position. Were the back pressure valve not provided, the smallest piston would move back independently of the larger piston under the weight of the body and it would be impossible to fix the tilting device at any position desired.

A further improvement has been realized by the two other embodiments of the invention shown in Figs. 7–10. The improvement consists in the innermost and smallest piston being fixed i. e. is connected with the chassis, whilst the larger cylindrical pistons surrounding it are movable i. e. can be raised and lowered. Therefore the outermost and largest cylinder engages the body directly, whilst the smallest piston is fixed by its lower end unto the chassis, thus enabling the pressure fluid to be conducted through it. In this way it is made possible to dispense with back pressure valve and buffer spring. At the beginning of the tilting process the outermost cylindrical piston, presenting the greatest surface is the first to be moved under the action of the pressure fluid. Not until the first piston has completed its stroke does the second piston begin to raise. As between the second piston and the smallest one fixed to the chassis there lies an annular chamber, which can be subjected to pressure at will, the whole device can be controlled as desired. The driver is thus able, at the moment the body is about to tip over—whether during its forward or backward movement—to put pressure upon the annular chamber to fix the tilting device securely in any position.

In Figs. 7 and 8 are shown diagrammatically an embodiment of the improved invention with a four-seat steering valve.

In Figs. 9 and 10 are shown diagrammatically one embodiment of the improved invention with a two-seat steering valve.

1' designates the innermost fixed pressure piston which is surrounded by two slidable cylindrical pistons 2' and 3'. The drawings show only two freely sliding pistons but it is of course possible to employ a greater number. S designates a valve-spindle, actuated by a control lever (not shown) and bearing in the embodiment shown in Figs. 7 and 8 four valve-cones. Two of these, viz the valve-cones 6 and 7 are rigidly connected with the valve-spindle S, whilst the two others 8 and 9 are slidably mounted on it and are under the action of two pressure springs 10 and 11. The valve-spindle and the parts thereto appertaining lie in a control box 12 divided into five compartments: the midmost chamber 12a communicating with the pressure pump P through pipe 13; the chambers 12b and 12c communicating with the lifting device through pipes 14 and 15 and the outermost chambers 12d and 12e communicating with the receptacle B for the pressure fluid through pipes 16a and 16b.

In the embodiment shown in Figs. 9 and 10 the control box has only four chambers 12f, 12g, 12h and 12i and the valve-spindle is provided only with two valves 6 and 7 rigidly connected with it. The pipe 13 leading from the pressure pump into the chamber 12f branches off beforehand in two directions. The one branch 15 leads to the tilting device. The other 20 serves as a connection to the back flow pipe 16, leading from the chamber 12h to receptacle B. Pipe 20 is provided with a safety valve 18. Chamber 12g is connected with the tilting device by a pipe 14 connected by a branch pipe with chamber 12i. The pipes 14 and 15 are so connected with the smallest innermost telescopic piston fixed to the chassis as to conduct the pressure fluid through this piston into the interior of the largest movable cylindrical piston and into the annular space situated between the smallest piston and the next larger one surrounding it.

I claim:

1. In a hydraulic tilting device, especially for tilting the bodies of motor vehicles, a series of telescopic members including pistons and cylinders, one end member of the series being relatively fixed and the others movable to an extended or collapsed position, and a fluid pressure system connected to extend and collapse the series including pressure and return lines connected to said telescoping series and to a pressure supply device and return reservoir, respectively, said pressure and return lines passing through a control box, and a series of mutually balanced, simultaneously movable poppet valves mounted on a common stem and cooperating with corresponding seats in said box and movable, at will, by the actuation of said stem, to one position to cause the telescopic series to be extended, to another position to cause the series to be collapsed and to an intermediate throttling position to cause the rate of relative movement of the series to be decreased or brought to rest in any desired position, while under the influence of the pressure supply device.

2. In a hydraulic tilting device according to claim 1, in which the cylinder surrounding all the telescopic pistons is relatively fixed, the outermost piston being provided with a resilient shock absorbing means between it and the cylinder with which it telescopes, whereby undue shock is avoided if the load should suddenly be taken off the telescoping series, as would occur if the load passed dead center, and a back pressure valve is located in the bottom of the largest piston slidably mounted in said cylinder, said valve being adapted to be operated by a stop arranged in the end of the cylinder to release the pressure behind the next piston.

3. In a hydraulic tilting device according to claim 1, in which certain of the poppet valves are relatively fixed with respect to the common operating stem and certain others are relatively movable with respect to said stem and biased in one direction by resilient means.

4. In a hydraulic tilting device, especially for tilting bodies of motor vehicles, a fluid motor comprising a series of telescopic members including pistons and cylinders, one end member of the series being relatively fixed and the other movable to an extended or collapsed position, and a fluid pressure system connected to extend and collapse the series, including pressure and return lines connected to said telescoping series and to a pressure supply device and return reservoir, respectively, said pressure and return lines passing through a control box, said control box comprising a centrally arranged chamber and two chambers flanking, respectively, the opposite sides of said central chamber, the central chamber being connected to a pressure line from said pressure supply device, a valve controlled port in the control box at the outer end of each of said flanking chambers, both said ports communicating with said return reservoir, and fluid connections from said flanking chambers to said pressure and return lines, the central chamber being connected through valve controlled ports with both said flanking chambers, and a series of valves arranged to be actuated by a common actuator and movable at will, to close one half of said ports while the other half is open, or vice versa, or to an intermediate throttling position.

5. In a hydraulic tilting device, especially for tilting bodies of motor vehicles, a fluid motor comprising a series of telescopic members including pistons and cylinders, one end member of the series being relatively fixed and the other movable to an extended or collapsed position, and a fluid pressure system connected to extend and collapse the series, including pressure and return lines connecting said motor, a pressure supply device, a return reservoir and a control box for regulating the flow of fluid in said system, said connecting lines including a main pressure line leading from the pressure supply device through the control box to the space between the closed end of a cylinder and piston of said motor, an auxiliary pressure line leading from that portion of the main pressure line extending between the pressure supply device and the control box to a space between the opposite end of said cylinder and the head of said piston and a return line leading from said control box to the return reservoir, said control box comprising two chambers flanking each other, a valve-controlled port in the control box at the outer end of each of said flanking chambers, one of said ports communicating with that portion of the main pressure line between the control box and the motor and the other of said ports communicating with the return line to the reservoir, the chamber associated with the first said port being connected with the main pressure line from the pressure supply device and the other of said chambers being connected with that portion of the main pressure line between the control box and motor, and a pair of valves coacting with said ports and actuated by a common actuator and movable, at will, to move one of said valves to open position and the other to closed position or to hold both valves in an intermediate throttling position.

OTTO BALLERT.